Feb. 12, 1952         B. E. FOLKE         2,585,104
                      WATER GAUGE
                   Filed Dec. 10, 1947
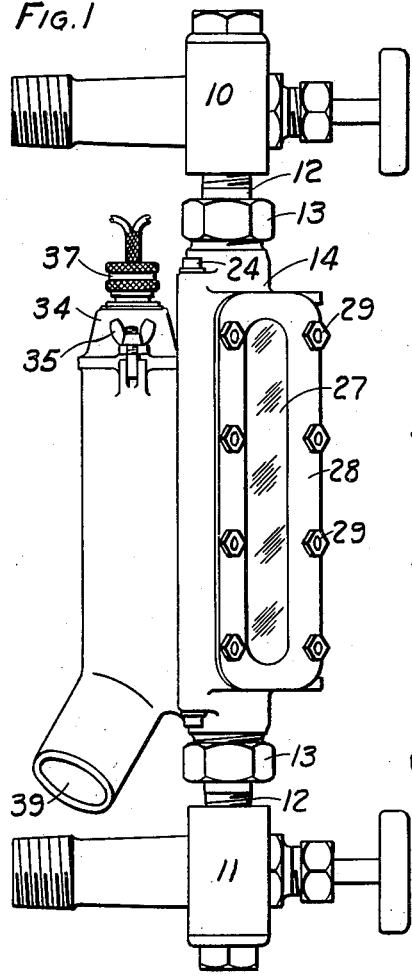
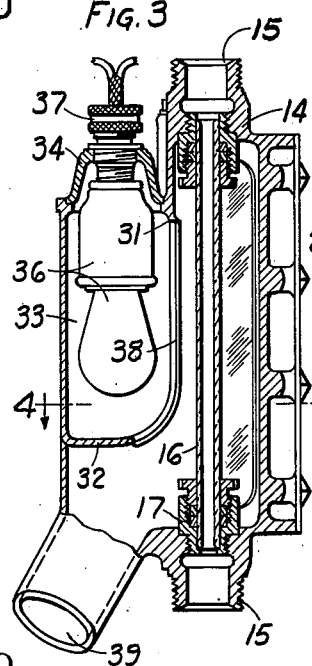
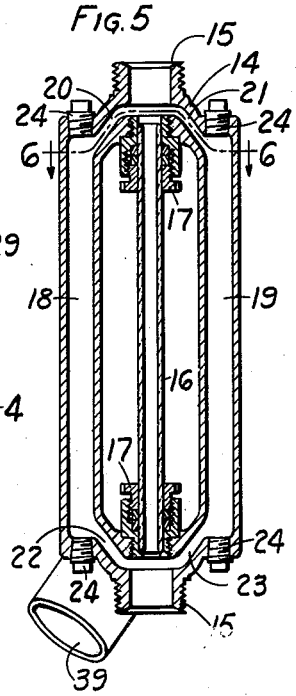
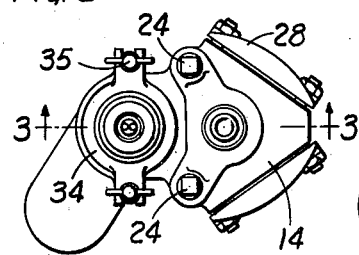
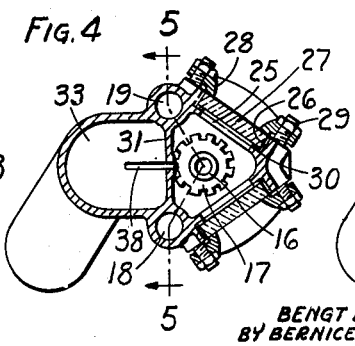
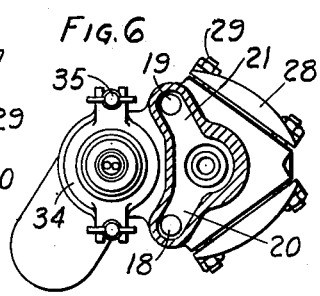
BENGT E. FOLKE, DECEASED
BY BERNICE FOLKE, ADMINISTRATRIX
INVENTOR
BY *Walter E. Wolchein*
ATTORNEY Patented Feb. 12, 1952

2,585,104

UNITED STATES PATENT OFFICE 2,585,104

WATER GAUGE

Bengt E. Folke, deceased, late of Mamaroneck, N. Y., by Bernice Folke, administratrix, Mamaroneck, N. Y., assignor to Nathan Manufacturing Company, New York, N. Y., a corporation of New York Application December 10, 1947, Serial No. 790,795

2 Claims. (Cl. 73—293)

This invention relates to water gauges, particularly the kind used on locomotives to indicate the level of the water in the boiler.

In such boilers owing to the swaying motion of the locomotive, the water in the commonly used tubular glass of the water gauge fluctuates a great deal which is intensified by the relatively small diameter of the tube. It is a principal object of the invention to provide means in a water gauge of this kind which steadies the surge of the water in the glass tube.

Another object is to provide a housing for the glass embodying the aforesaid means which can removably be placed within the customary brackets or shut-off valves screwed into the boiler.

Other objects will become apparent in the following specification and the accompanying drawings in which a preferred embodiment of the invention is shown and in which Fig. 1 is an elevational exterior view of a gauge including the usual brackets or shut-off valves;

Fig. 2 is a plan view of the removable gauge structure proper;

Fig. 3 is a longitudinal sectional view along the plane of line 3—3 in Fig. 2;

Fig. 4 is a horizontal cross sectional view along the plane of line 4—4 in Fig. 3;

Fig. 5 is a longitudinal sectional view along the plane of line 5—5 in Fig. 4; and Fig. 6 is a horizontal cross sectional view along the plane of line 6—6 in Fig. 5.

Like characters of reference denote similar parts throughout the several views and the following specification.

In Fig. 1, 10 and 11 are, respectively, the top valve and the bottom valve of a water gauge. These valves are customarily screwed into a boiler, in case of a locomotive generally into the backhead of the boiler. 12 is a coupling sleeve and 13 a coupling nut screwed into each of the valves 10 and 11 having removably fastened between them a casing 14 of the gauge proper.

Casing 14 is provided with tubular ends 15 at its top and bottom, exteriorly threaded to fit coupling nuts 13. 16 is a tubular glass held within the casing and substantially in line with tubular ends 15 by stuffing boxes 17. 18 and 19 are longitudinal by-pass ducts within the casing, connected by cross passages 20 and 21 at the top and passages 22 and 23 at the bottom with tubular ends 15, above and below, respectively, the ends of glass 16. 24 are plugs at the top and bottom of each of by-passes 18 and 19. By-passes 18 and 19 and passages 20, 21, 22 and 23 are symmetrically disposed with respect to tubular glass 16.

The front of the casing is substantially V-shaped and has an oblong sight opening 25 at each of the inclined faces surrounded by a recess 26 for a flat shield glass 27 which is held against casing 14 by a frame 28 fastened to the casing by studs and nuts 29. 30 is sheet packing to permit the glass to be drawn tightly against the frame by the cover without breaking.

31 is a wall in casing 14 turned at right angles at 32 forming a chamber 33 within the casing. 34 is a cap, removably secured to the top of chamber 33 in back of the casing by means of thumb nuts 35. 36 is an electric lamp bulb and socket fastened to cap 34 by means of ferrule 37 in a manner well known in the art. 38 is a narrow slot extending through wall 31. That portion of casing 14 below chamber 33 terminates in a relatively large drain connection 39.

The water gauge functions as follows:

Top valve 10 being connected to the steam space and bottom valve 11 to the water space of the boiler, the level of the water will be indicated in glass 16 which is in communication with the steam as well as the water space of the boiler. The rays of light from bulb 36 in chamber 33 pass through narrow slot 38 in wall 31 and illuminate glass 16 so that the level of the water in the glass can readily be observed through sight glasses 27 from both sides of the gauge, making it possible, in case of an application to a locomotive, for the engineer as well as the fireman to read the gauge. In locomotives, the level of the water in gauges, as made heretofore, is subject to rapid fluctuations owing to the swaying motion of the locomotive accentuated by the relatively small inner diameter of glass 16. By providing by-passes 18 and 19 the area of communication between the steam and water space of the boiler is greatly increased over that of the inner diameter of glass 16. This effectively eliminates the up and down surge of the water in glass tube 16 and enables observations of the level of the water to be made more accurately. The symmetrical disposition of by-passes 18 and 19 in the casing, besides contributing to better reading of the gauge, also reinforces casing 14. Plugs 24 at the top and bottom of each by-pass 18 and 19, close openings provided primarily to facilitate holding the core during the casting of the casing, but which serve also for cleaning purposes or for an examination of the passages.

In case of breakage of glass 16, broken glass and steam and water will be carried off through drain opening 39 to which a pipe is connected which terminates generally below the floor of the locomotive cab. Shield glasses 27 prevent broken pieces of glass from hitting the crew in the cab, and steam and water passing out through the extra size drain, the cab remains clear and unclouded, enabling the crew instantly to close valves 10 and 11 until necessary repairs can be made. Slot 38 through which the rays of light pass is so narrow and small in relation to the drain opening that no damage to the bulb will take place in case of breakage of glass 16.

Attention is particularly drawn to the unitary structure of the gauge proper with all its component parts which makes it possible to remove readily from its position between the shut-off valves the casing with its by-passes, shield glasses, tubular glass or remnants thereof, stuffing boxes, as well as the illuminating means, and replace it.

While a tubular glass has been shown, a flat glass of the well known reflex type may be substituted, of course, and in such event, the shield glasses omitted, if so desired, as well as the illuminating means.

It is obvious that many changes of form, proportions and minor details of construction may be resorted to without departing from the principles or sacrificing any of the advantages of the invention as defined in the appended claims.

What is claimed as new, is:

1. In a water level gauge, a protective casing provided with transparent areas and with upper and lower openings for connection with a boiler, a transparent gauge tube supported between and connecting with said openings, by-pass channels embodied in the walls of said casing and extending generally parallel to said gauge tube, and lateral passages within the casing connecting the upper and lower ends of said channels with said boiler connection openings and with said gauge tube.

2. A gauge according to claim 1 in which the by-pass channels extend through from end to end of the casing to facilitate cleaning, and are provided with removable plugs normally closing the ends of said channels.

BERNICE FOLKE,
*Administratrix of Estate of Bengt E. Folke, Deceased.*

REFERENCES CITED

The following references are of record in the file of this patent:

UNITED STATES PATENTS

| Number | Name | Date |
| --- | --- | --- |
| 734,040 | Brooks | July 21, 1903 |
| 738,315 | Gehre | Sept. 8, 1903 |
| 1,202,511 | Groff | Oct. 24, 1916 |
| 1,345,799 | Moyer | July 6, 1920 |
| 1,438,208 | Apps | Dec. 12, 1922 |
| 2,149,100 | Ploen | Feb. 28, 1939 |